United States Patent
Smithers

(10) Patent No.: US 10,974,153 B2
(45) Date of Patent: Apr. 13, 2021

(54) STREAMABLE COMPRESSED GEOMETRY FOR LIVE BROADCAST

(71) Applicant: Disney Enterprises, Inc., Burbank, CA (US)

(72) Inventor: Andi Smithers, Escondido, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/250,924

(22) Filed: Jan. 17, 2019

(65) Prior Publication Data

US 2020/0230503 A1 Jul. 23, 2020

(51) Int. Cl.
- *A63F 13/86* (2014.01)
- *A63F 13/77* (2014.01)
- *A63F 13/335* (2014.01)
- *A63F 13/338* (2014.01)

(52) U.S. Cl.
CPC .......... *A63F 13/77* (2014.09); *A63F 13/335* (2014.09); *A63F 13/338* (2014.09); *A63F 13/86* (2014.09); *A63F 2300/407* (2013.01); *A63F 2300/409* (2013.01); *A63F 2300/534* (2013.01)

(58) Field of Classification Search
CPC ... A63F 13/86; A63F 13/352; A63F 2300/877
See application file for complete search history.

(56) References Cited

U.S. PATENT DOCUMENTS

| | | | | |
|---|---|---|---|---|
| 5,558,339 A | * | 9/1996 | Perlman | A63F 13/12 463/42 |
| 5,583,561 A | * | 12/1996 | Baker | H04N 7/17336 348/E7.073 |
| 5,687,257 A | * | 11/1997 | Paik | H04N 19/10 375/240.03 |
| 5,742,289 A | * | 4/1998 | Naylor | H04N 19/159 345/419 |
| 6,014,706 A | * | 1/2000 | Cannon | H04N 21/23406 375/E7.016 |
| 9,003,461 B2 | * | 4/2015 | Perlman | H04N 19/132 725/115 |

(Continued)

FOREIGN PATENT DOCUMENTS

| JP | 2017520867 A | 7/2017 |
|---|---|---|
| KR | 20180018845 A | 2/2018 |

OTHER PUBLICATIONS

Extended European Search Report for Application No. 20152277.8-1209 dated May 29, 2020.

(Continued)

*Primary Examiner* — Steven J Hylinski

(74) *Attorney, Agent, or Firm* — Patterson + Sheridan, LLP

(57) ABSTRACT

A system and method for high-quality, three-dimensional live streaming of graphical content. Graphical geometry data generated through execution of multimedia software, e.g. a video game, is converted into a geometry streaming format that is independent of the operating system of the host system running the software. The converted data is broadcast over a network to one or more spectator systems, which are configured to execute the converted data to render locally the three-dimensional content. A spectator is therefore enabled to change a viewing angle within the three-dimensional content regardless of the viewing angle associated with the host system.

19 Claims, 6 Drawing Sheets

(56) References Cited

U.S. PATENT DOCUMENTS

| | | | |
|---|---|---|---|
| 10,112,111 B2 | 10/2018 | Marks et al. | |
| 10,543,430 B2* | 1/2020 | Osman | A63F 13/525 |
| 2002/0002074 A1* | 1/2002 | White | G06Q 20/06 |
| | | | 463/25 |
| 2003/0038805 A1* | 2/2003 | Wong | A63F 13/12 |
| | | | 345/473 |
| 2006/0058103 A1* | 3/2006 | Danieli | A63F 13/87 |
| | | | 463/42 |
| 2007/0117635 A1* | 5/2007 | Spanton | A63F 13/86 |
| | | | 463/43 |
| 2009/0119738 A1* | 5/2009 | Perlman | H04N 19/46 |
| | | | 725/133 |
| 2009/0315978 A1* | 12/2009 | Wurmlin | G06T 7/20 |
| | | | 348/43 |
| 2010/0166064 A1* | 7/2010 | Perlman | A63F 13/355 |
| | | | 375/240.07 |
| 2010/0166068 A1* | 7/2010 | Perlman | H04N 19/436 |
| | | | 375/240.12 |
| 2010/0167816 A1* | 7/2010 | Perlman | A63F 13/355 |
| | | | 463/30 |
| 2011/0107220 A1* | 5/2011 | Perlman | H04N 19/107 |
| | | | 715/720 |
| 2011/0126255 A1* | 5/2011 | Perlman | H04N 19/61 |
| | | | 725/116 |
| 2014/0004951 A1* | 1/2014 | Kern | A63F 13/86 |
| | | | 463/42 |
| 2014/0113718 A1* | 4/2014 | Norman | A63F 13/497 |
| | | | 463/31 |
| 2014/0176589 A1* | 6/2014 | Duluk, Jr. | G09G 5/001 |
| | | | 345/541 |
| 2014/0204080 A1* | 7/2014 | Goel | G06T 1/60 |
| | | | 345/419 |
| 2015/0251095 A1* | 9/2015 | Perrin | G06F 9/452 |
| | | | 463/31 |
| 2016/0250553 A1* | 9/2016 | Ikenaga | A63F 13/86 |
| | | | 463/31 |
| 2016/0361658 A1 | 12/2016 | Osman et al. | |
| 2017/0157512 A1* | 6/2017 | Long | A63F 13/86 |
| 2017/0266549 A1* | 9/2017 | Paradise | A63F 13/332 |
| 2017/0282075 A1* | 10/2017 | Michot | A63F 13/497 |
| 2019/0099678 A1* | 4/2019 | Khan | G06T 11/60 |
| 2019/0184283 A1* | 6/2019 | Kim | A63F 13/79 |
| 2019/0192974 A1* | 6/2019 | Eatedali | A63F 13/69 |

OTHER PUBLICATIONS

Bharambe, Ashwin & Padmanabhan, Venkata & Seshan, Srinivasan. (2004). Supporting Spectators in Online Multiplayer Games.

Korean Intellectual Property Office (KIPO) Notice of Preliminary Rejection for Application No. 10-2020-0006545 dated Jan. 21, 2021.

* cited by examiner

STREAMABLE COMPRESSED GEOMETRY FOR LIVE BROADCAST

TECHNICAL FIELD

The present disclosure relates generally to broadcasting media. Specifically, the technology disclosed herein is directed to broadcasting geometry data of a collaborative or single experience, such as a game player's experience for local rendering at a spectator's system, an on-demand streaming experience, live video, etc.

DESCRIPTION OF THE RELATED ART

Computing and network communication technology enable game participants to interact with one another and their environment as part of an interactive game experience. Game participants may interact with a user interface of a computing platform hosting one or more applications capable of providing a media-rich game experience. Such computing platforms may be connected to other devices through a data communication network to affect a gaming experience in response to real-time events. For example, a game participant's computing platform may communicate with a server to obtain additional information. The computing platform may process this additional information to provide an interactive experience. Alternatively, in a multi-participant game, such as a massively multiplayer online (MMO) game, a game participant's computing platform may deliver an interactive game experience to the game participant based on information received from another participant's computing platform.

Recently, there has been a growing trend in the gaming community, where game participants utilize a service to broadcast game play (in real-time) to spectators. For example, a spectator system may receive streamed broadcasts from a host game system reflecting the game play being conducted/occurring on the host game system. A streamed broadcast may include video showing the game play being executed at a host game system. Host game systems may include network-based video streaming systems or may have access to streaming services that allow game players to broadcast live streams of their game play to one or more spectators. Such streaming services are capable of providing many, e.g., hundreds or thousands of game feeds (live broadcast streams), which can be viewed by any one or more of a spectator using a spectator game system or other spectator device.

BRIEF SUMMARY OF THE DISCLOSURE

In accordance with one embodiment, a system comprises a host system comprising a host streaming subsystem, and one or more spectator systems, each spectator system comprising a spectator streaming subsystem. The host streaming subsystem is configured to broadcast one or more geometry stream buffers associated with a video game environment of the host system to the one or more spectator systems. Each spectator streaming subsystem is configured to execute the one or more geometry stream buffers broadcast by the host streaming subsystem to render the video game environment of the host system locally at the spectator system.

In some embodiments, the host system comprises a host console, a host controller configured to record a player input and enable the player to interact with the video game environment associated with the host system, and a host display configured to display the video game environment to the player.

In some embodiments, the host display, the controller, and the console of the host system are integrated into a single device.

In some embodiments, the host streaming subsystem is communicatively coupled to the host console.

In some embodiments, the host streaming subsystem is integrated within the host console.

In some embodiments, the system further comprises one or more central servers communicatively coupled to the host system and the one or more spectator systems, the one or more central servers configured to receive and maintain the one or more geometry stream buffers broadcast by the host system.

In some embodiments, the one or more geometry stream buffers comprises static command buffers, dynamic delta data, graphical geometry data, or a combination thereof. In some embodiments, the host streaming subsystem is configured to generate one or more static command buffers and broadcast the one or more static command buffers to the one or more spectator systems. The one or more static command buffers represent a plurality of commands associated with one or more objects within the video game environment and are generated at an initialization stage of the host system. In some embodiments, the host streaming subsystem is configured to generate one or more dynamic delta command buffers and broadcast the dynamic delta command buffers to the one or more spectator systems. The one or more dynamic delta command buffers represent changes in one or more attributes of one or more objects within the video game environment.

In some embodiments, rendering the video game environment of the host system locally at the spectator system comprises the spectator streaming subsystem collecting the one or more static command buffers and one or more dynamic delta command buffers as each is broadcast by the host system. Rendering the video game environment of the host system locally at the spectator system further comprises interpreting a plurality of commands for execution by the spectator console of the spectator system.

In some embodiments, the spectator system comprises a spectator console, a spectator controller configured to enable a spectator to change a viewing angle within the video game environment, and a spectator display configured to display the video game environment to the spectator.

In some embodiments, the spectator controller is limited to control of the viewing angle within the video game environment.

In accordance with another embodiment, a method comprises generating, by a host graphical system, one or more command buffers representing instructions for rendering a three-dimensional environment. The method may further comprise converting the one or more command buffers into a geometry stream format to generate one or more geometry stream buffers. Further still, the method may comprise broadcasting the one or more geometry stream buffers, wherein the geometry stream format is independent of an operating system of the host graphical system.

In some embodiments, generating the one or more command buffers comprises generating instructions associated with a plurality of graphical geometries representing one or more objects in the three-dimensional environment.

In some embodiments, generating the one or more command buffers comprises generating one or more static command buffers, wherein each static command buffers comprise a plurality of instructions representing one or more objects in the three-dimensional environment.

In some embodiments, generating the one or more command buffers comprises collecting one or more graphical commands place within a native command buffer of the host graphical system.

In accordance with another embodiment, a method comprises collecting, by a spectator graphical system, a plurality of command buffers representing instructions for rendering a three-dimensional environment broadcast over a network. The method may further comprise converting the instructions within the plurality of command buffers to a format suitable for execution by the spectator graphical system, and writing the converted instructions into a native command buffer of the spectator graphical system. Further still, the method may comprise rendering the three-dimensional environment at the spectator graphical system.

In some embodiments, the method may further comprise changing a viewing angle within the rendered representation of the three-dimensional environment independent of a viewing angle within the three-dimensional environment of a native viewing angle of the broadcasted plurality of command buffers.

In some embodiments, changing a viewing angle comprises receiving an input from a spectator controller.

In some embodiments, rendering the three-dimensional environment at the spectator graphical system comprises traversing by a graphics processing unit (GPU) of the spectator graphical system the native command buffer of the spectator graphical system, and executing the converted instructions as the converted instructions are traversed by the GPU of the spectator graphical system.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Figure 1A:
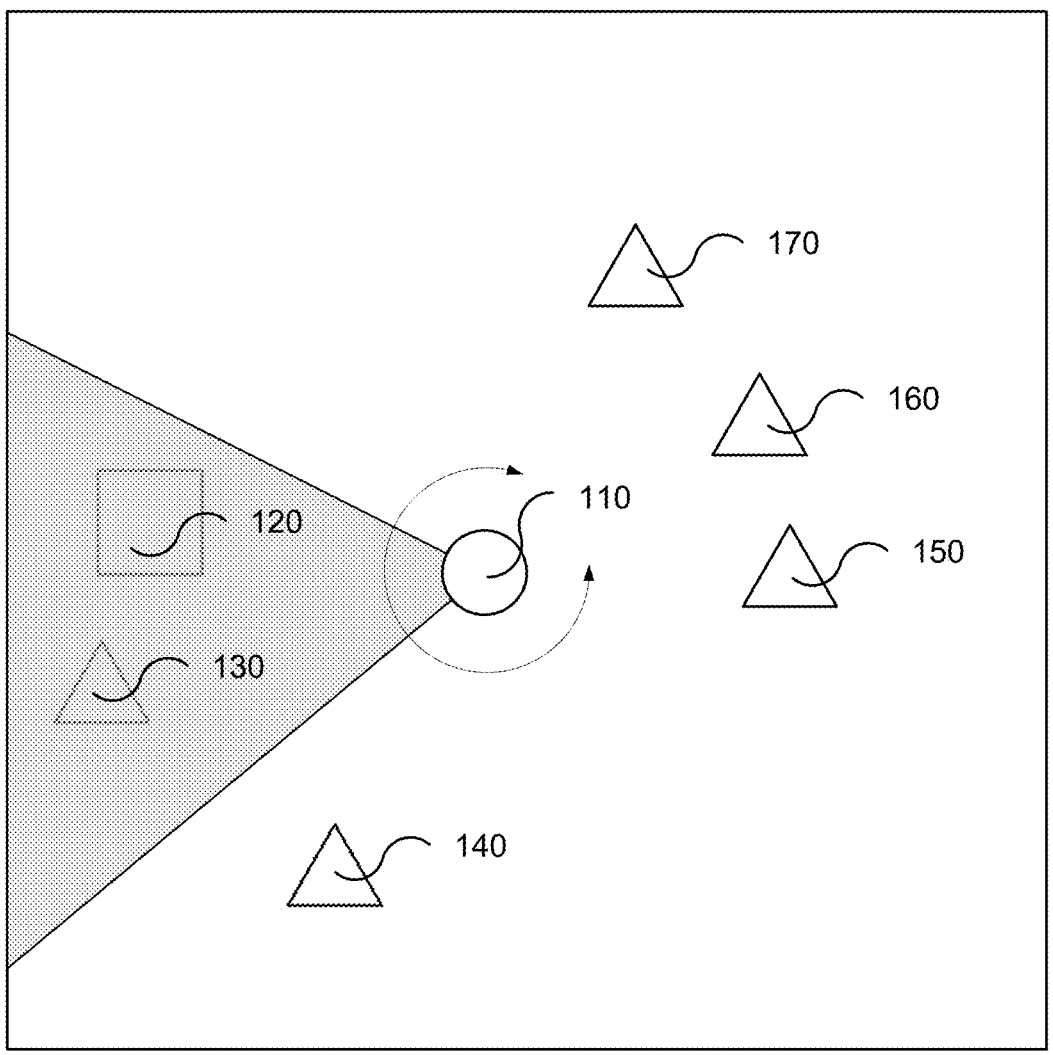
FIG. 1A is an illustration of the perspective of a player within a gaming environment.
Figure 1B:
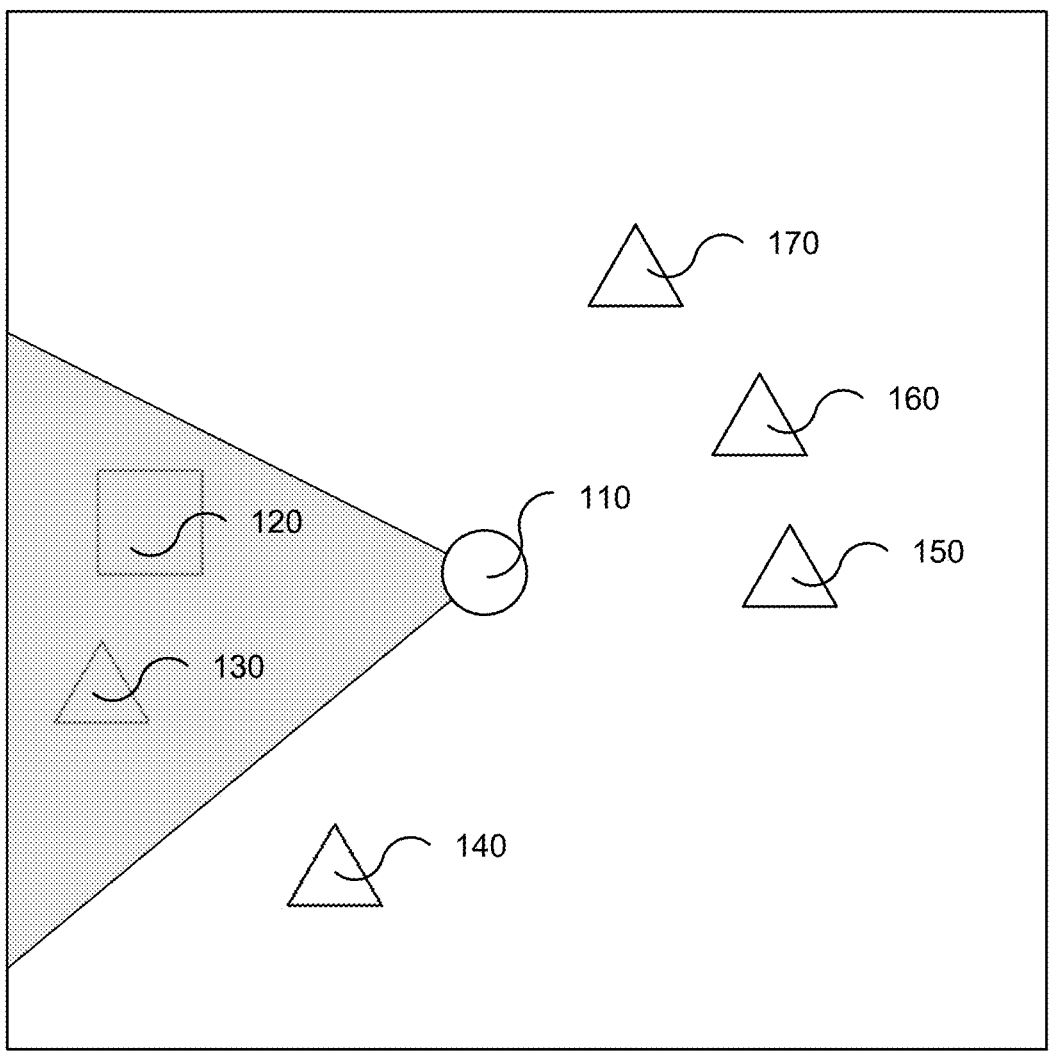
FIG. 1B is an illustration of the perspective of a spectator viewing a stream of a player's gameplay within a gaming environment.

Recently, there has been a growing trend in the gaming community, where game participants utilize a service to broadcast game play (in real-time) to spectators. However, streaming game feeds involve streaming a video capture of the game play occurring on the host game system. The spectator game system is limited to viewing only what a user(s) of the host game system is seeing/viewing, i.e., only from the perspective of the host game system. A representation of this limitation is illustrated in FIGS. 1A and 1B. In FIG. 1A, when playing a game, such as an MMO or other immersive three-dimensional game, a player 110 is placed within a 360° world (represented by the box). The player's 110 perspective or field of vision is represented by the shaded area. During gameplay, the player 110 can move around the world to view a multitude of objects, such as 120 and 130 (currently within the player's 110 field of view) as well as objects 140-170. Although the player 110 is unable to see the objects 140-170 as shown, those objects are (ostensibly) present within the world, and the player 110 has the control to change his or her field of view and view the objects 140-170. The player 110 has full control to move around the world, as represented by the directional indicator surrounding player 110.

When the player streams his or her gameplay to spectators, however, the stream is limited in a similar manner as shown in FIG. 1B. Such streams can be thought of as a camera attached to a player's 110 head. The spectator's perspective is limited solely to the field of view the player 110 has at a given moment. To the spectator, only objects 120 and 130 illustrated in FIG. 1B exist, and the spectator has no ability to control the perspective to see other objects around the player 110.

This limitation arises from the manner in which such streams are captured and transmitted to spectators, i.e., as captured video. The frames of the video capture only what is visible on the screen to the player 110 at the time of capture, in a two-dimensional representation. Accordingly, the spectator does not receive all of the information related to the gaming environment, limiting the ability of the spectator to explore actions or objects that lay outside the player's 110 field of view at the time of capture. Moreover, broadcasting video generally involves lossy compression of the video, resulting in video (at the spectator game system) that is degraded in quality compared to the source video.

In accordance with various embodiments of the technology disclosed herein, command queues representative of references to command buffers and/or changes to visual geometries are transmitted to a spectator game system, rather than transmitting video. In particular, the data used to render the geometries of visual elements in a game (being played on a host game system) is transmitted to the spectator game system for rendering. In this way, a spectator game system is able to "rebuild" what would be seen in a streamed broadcast of the game play. Not only is this rendering lossless, but a spectator may, through a spectator game system, manipulate rendering of the geometries. For example, a spectator may change camera views, see aspects/elements of a game environment, etc., regardless of the view or perspective of a user playing the game on the host game system. Further still, the spectator game system (or other spectator device) can be independent of the host game system because the actual data used for rendering the geometries is used. Additionally, command buffers representative of previously rendered geometries can simply be referenced along with any deltas (changes to the geometries) in a command queue. Thus, bandwidth requirements, traffic throughput, etc. can be reduced.

For ease of discussion, the technology disclosed herein will be described in detail in the context of computer or console gameplay. A person of ordinary skill in the art, however, would understand that the technology is applicable in other contexts as well, and would know how to modify the technology to work in other contexts. For example, the principles are applicable to local rendering of computer generator animations, such as animated movies, wherein scalable vector graphics (SVG) data can be sent in a similar manner for local rendering on a spectator system.

Figure 2:
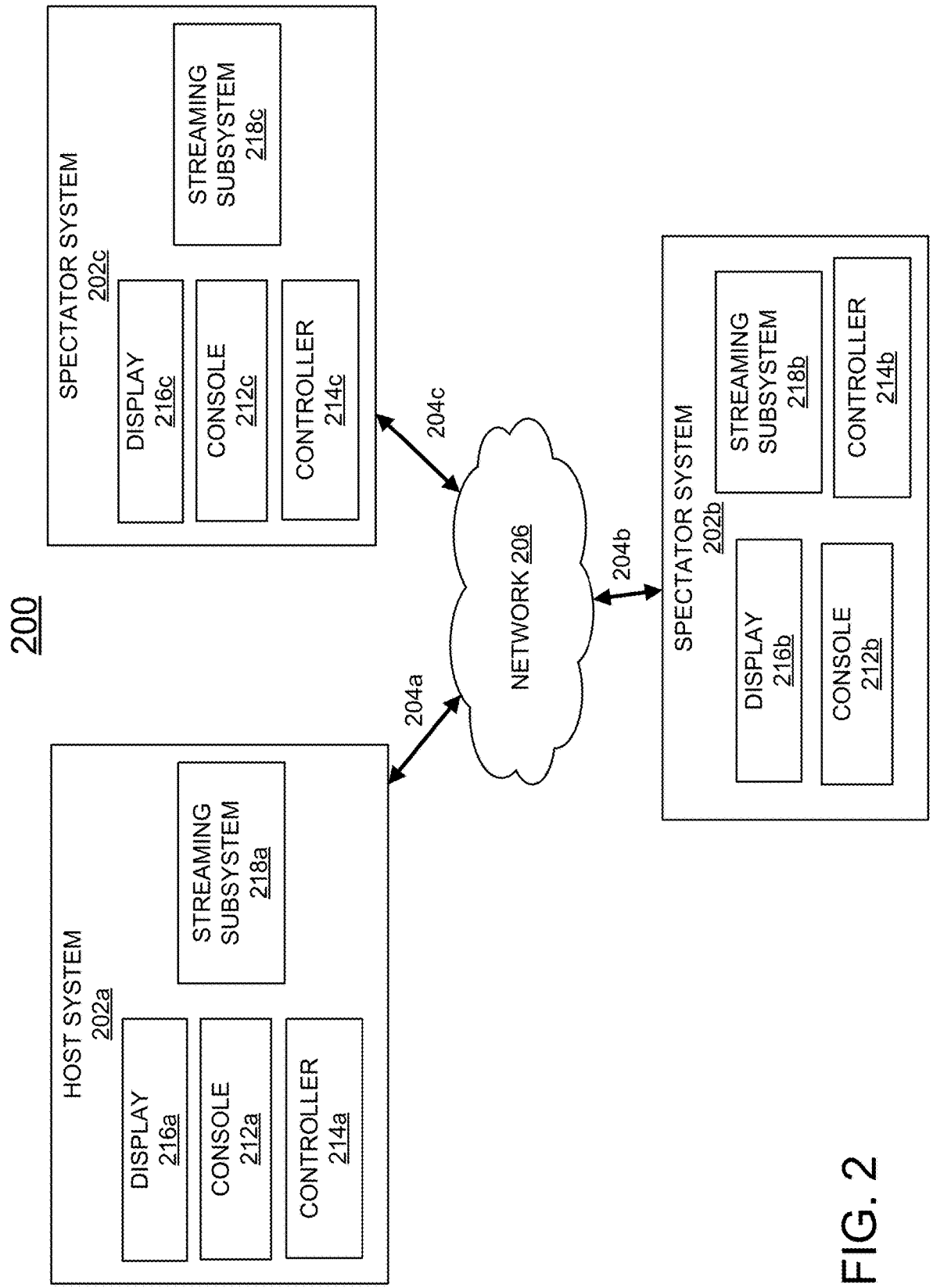
FIG. 2 is a block diagram illustrating an example streaming system in accordance with the present disclosure.

FIG. 2 illustrates an example streaming system 200 in which various embodiments may be implemented. As shown, streaming system 200 includes a host system 202a, which represents the system on which a player (i.e., player 110 of FIGS. 1A and 1B) is playing a game. Each host system 202a may further include a player/user input device or controller 214 connected to the game console 212, and a display 216 connected to game console 212. Game console 212 is adapted for connection to the network 206 via connection 204a. Although in the example shown, controller 214 and display 216 are shown as distinct from game console 212, it should be understood that host system 202a may be implemented in a variety of ways, for example with the controller 214, display 216, and game console 212 forming a single integrated device or apparatus. Non-limiting examples of host system 202a include: desktop or laptop computers; smartphones; tablets; PDAs; or a gaming platform (e.g., PlayStation 4®, Xbox One®, and Nintendo Switch®, among others); among other media-capable devices.

Within the streaming system 200, there may be one or more spectator systems 202b, 202c. The spectator systems 202b, 202c can comprise the same components as host system 202a (as described above) in various embodiments. Each spectator system 202b, 202c could be a different type of system. For example, in some embodiments, host system 202a may include a PlayStation 4®, while spectator system 202b is a mobile device (e.g., a smartphone) and spectator 202c may be an Xbox One®. As described in further detail below, the technology disclosed herein enables for device-independent transmission of geometry data, allowing spectators to view gameplay on whichever device he or she wants. Similar to host system 202a, each spectator system 202b, 202c may be operatively connected to network 206 via respective network connections 204b, 204c.

Figure 3:
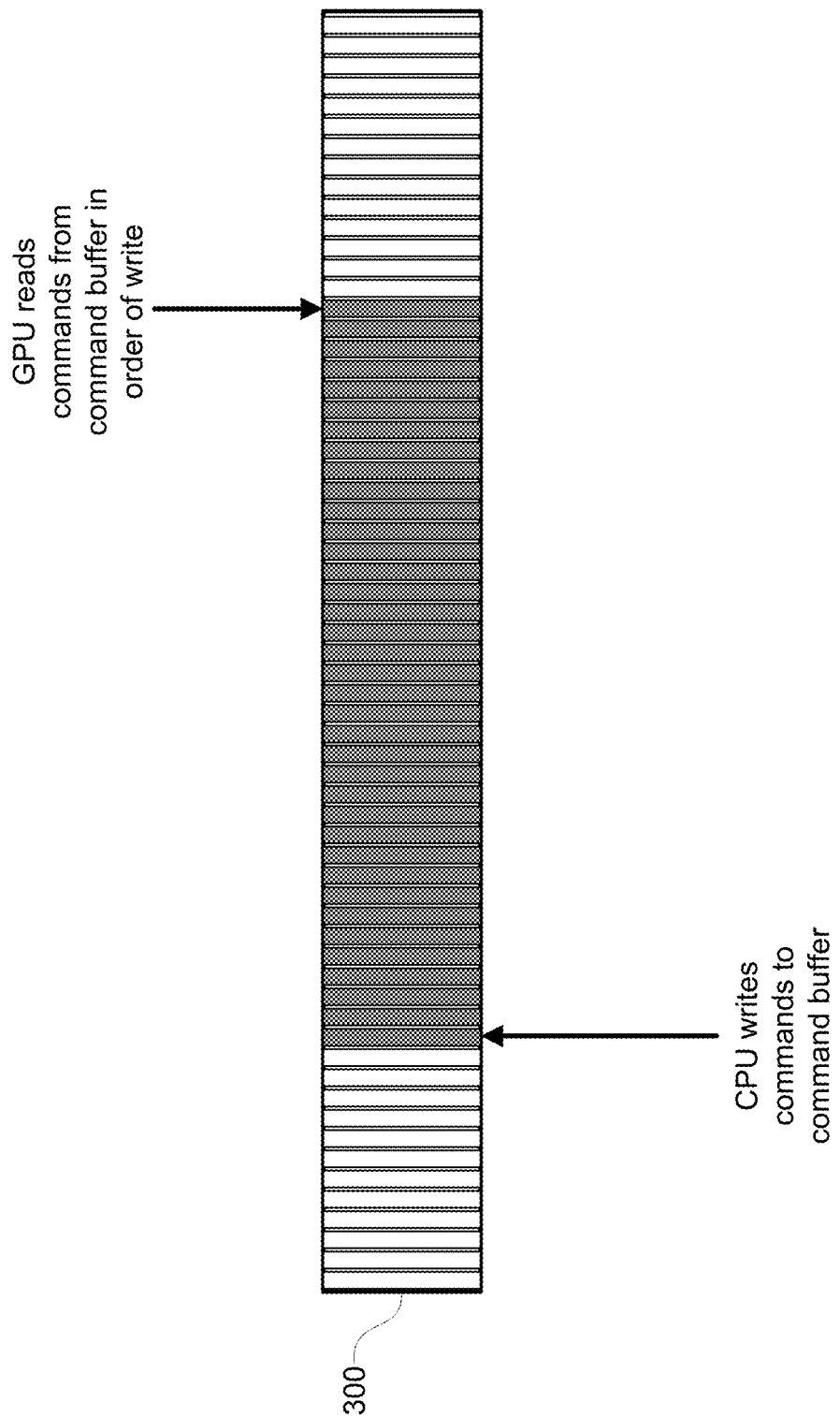
FIG. 3 illustrates an example command buffer in accordance with the present disclosure.

As is understood by those of ordinary skill in the art, during gameplay, a host system generates or renders the game environment or world with which the player interacts. A central processing unit (CPU) generates geometry information, which serves as the input to a graphics processing unit (GPU). Each component works in parallel; there are two "threads" going on, one for the CPU and one for the GPU. The components communicate through a command buffer, which stores pending geometry information (or commands) from the CPU which the GPU has yet to execute. FIG. 3 illustrates this relationship. As shown, the CPU writes commands into the command buffer 300, with the shaded boxes representing the commands the CPU has written to the command buffer 300. At the same time, the GPU is traversing the command buffer 300, executing the commands. The GPU executes the commands in the order in which the commands were placed in the command buffer 300 by the CPU.

Various embodiments of the present disclosure allow for the creation of reference, or static, command buffers. A static command buffer contains commands associated with rendering a particular object or scene. Similar to indirect command buffers, the static command buffers encode a group of commands associated with a particular object or scene, allowing the CPU to write only one command (e.g., "execute static buffer XYZ") as opposed to all of the commands contained within the static command buffer each time the object is to be rendered. For example, during gameplay, a player may enter a stadium within the world. The architecture and geometries for the stadium are known and referenced when the CPU writes commands to the command buffer. This type of information is available for all objects which may be present within a frame. Static command buffers can be set during initialization of the game, i.e., at start-up.

The technology disclosed herein leverages the availability of the geometry data generated by the CPU and GPU of a player's system to enable a spectator to view a three-dimensional representation of the gameplay world, instead of the traditional two-dimensional video-capture representation of the prior art. Embodiments of the technology broadcast a version of the command buffer from the player's system (e.g., host system 202a of FIG. 2) to spectator systems. These spectator systems are then capable of rendering the world locally. By allowing local rendering, the technology disclosed herein avoids the quality issues associated with current approaches using lossy compressed video. Moreover, because the spectator system has all the geometry information available to the host system, the spectator system is capable of recreating the entire environment, allowing the spectator to change perspective and view the player's gameplay from different angles and to see other objects within the environment which may not be in the player's field of view at a given moment.

FIG. 2 illustrates an example streaming system 200 in which various embodiments may be implemented. As shown, streaming system 200 includes a host system 202a, which represents the system on which a player (i.e., player 110 of FIGS. 1A and 1B) is playing a game. Each host system 202a may further include a player/user input device or controller 214a connected to the game console 212a, and a display 216a connected to game console 212a. Game console 212a is adapted for connection to the network 206 via connection 204a. Although in the example shown, controller 214a and display 216a are shown as distinct from game console 212a, it should be understood that host system 202a may be implemented in a variety of ways, for example with the controller 214a, display 216a, and game console 212a forming a single integrated device or apparatus. Non-limiting examples of host system 202a include: desktop or laptop computers; smartphones; tablets; PDAs; or a gaming platform (e.g., PlayStation 4®, Xbox One®, and Nintendo Switch®, among others); among other media-capable devices.

Within the streaming system 200, there may be one or more spectator systems 202b, 202c. The spectator systems 202b, 202c can comprise the same components as host system 202a (as described above) in various embodiments. Each spectator system 202b, 202c could be a different type of system. For example, in some embodiments, host system 202a may include a PlayStation 4®, while spectator system 202b is a mobile device (e.g., a smartphone) and spectator 202c may be an Xbox One®. As described in further detail below, the technology disclosed herein enables for device-independent transmission of geometry data, allowing spectators to view gameplay on whichever device he or she wants. Similar to host system 202a, each spectator system 202b, 202c may be operatively connected to network 206 via respective network connections 204b, 204c.

Host system 202a and spectator systems 202b, 202c further include a streaming subsystem (218a, 218b, 218c, respectively). Streaming subsystem 218a, 218b, and 218c may be separate components in various embodiments, or in others, it may be incorporated within the consoles 212a, 212b, 212c of the respective systems. Streaming subsystem 218a of host system 202a takes the geometry data, commands, and command buffers present within the host system 202a and broadcasts that information to network 206 over the communication path 204a. In various embodiments, streaming subsystem 218a may transmit the command buffers and geometry data to each of the spectator systems 202b, 202c, while in other embodiments the data may be transmitted to a central server to which each system 202a, 202b, 202c has access.

As would be understood by those of ordinary skill in the art, when playing a game, e.g., a game being played via host system 202a, a game engine executing on the console 212a calls graphics that are rendered on display 216a of host system 202a. The rendering of graphics may be accomplished using command buffers sent by the CPU of console 212a to a GPU, wherein the graphics are displayed on display 216a as scenes. Within host system 202a, these commands are formatted with respect to the particular operating system of host system 202a. When the player wants to live stream his or her gameplay, prior art approaches focused on capturing video frames of the action, to avoid the operating system-dependent issues that arise from sending interactive commands between different systems. As discussed above, these prior approaches rely on lossy compression of video data, lowering the quality of the stream and limiting the ability of the spectator to change viewing angles.

The host streaming subsystem 218a alleviates this issue in various embodiments by collecting the underlying graphics data and commands in the command buffers and broadcasting that information over the network. At its lowest level, all graphical objects are a collection of geometric primitives, e.g., vertices, lines, and/or triangles. This information is not necessarily operating system-dependent. Host streaming subsystem collects this geometric data, as well as the commands issued by the CPU of host system 202a to the GPU. Host streaming subsystem 218a converts the commands into a platform-agnostic format, enabling a system to execute the commands independent of the particular operating system employed. In various embodiments, the host streaming subsystem may include an application programming interface (API) library that is configured to translate commands from an operating system into a generic format. The collected information can include all of the graphics information associated with the game environment, not merely those graphics currently within the perspective view of the player at host system 202a.

The converted commands and geometric data are then broadcast by the host streaming subsystem 218a over the network 206. In some embodiments, the information may be broadcast directly to the one or more spectator systems 202b, 202c within the network 206. In others, host streaming subsystem 218a can broadcast the information to one or more central servers (not pictured), which are configured to receive and maintain the information. In still other embodiments, the one or more central servers may be configured to perform the conversion discussed above with respect to host streaming subsystem 218a.

Instead of receiving a compressed video stream, the spectator systems 202b, 202c in the network 206 will receive the converted command buffers and geometry data in accordance with the technology disclosed herein. In various embodiments, spectator streaming subsystem 218b, 218c is configured to traverse the received command buffers and format the commands for use with the operating system of the respective spectator systems 202b, 202c. In various embodiments, the spectator streaming subsystem 218b, 218c may generate compatible commands based on the received command buffers from host system 202a, and add the compatible commands to the native command buffer of the spectator system 202b, 202c (i.e., in a similar manner as the CPU/GPU relationship discussed above).

In essence, each spectator system 202b, 202c locally renders the three-dimensional world within which the player at host system 202a is operating. As discussed above, a greater amount of information can be sent to spectator systems 202b, 202c, including command buffers associated with objects and portions of the environment not within the current perspective of the player at host system 202a. In this way, the spectators are capable of generating a three-dimensional representation of the player's gameplay at host system 202a, allowing the spectators to change the perspective or viewing angle independent of the player's perspective at the host system 202a. This enables a more immersive and functional viewing experience for the spectator, compared to the limited, two-dimensional representation of current video capture techniques. Moreover, because spectator systems 202b, 202c are locally rendering the graphics information that was rendered at the host system 202a, the quality of the broadcasted gameplay stream is near to or the same as the rendering at host system 202a.

Unlike in the context of multiple players interacting in a game, such as an MMO, the embodiments of the technology discussed herein do not contain game mechanics information (i.e., data representing the interaction of different players with each other or the environment). The host streaming subsystem 218a broadcasts only the graphics information associated with the three-dimensional environment of the gameplay. The technology disclosed herein is leveraging the graphical information that is necessarily generated by the host system during gameplay, but which is not necessarily platform-dependent, and can therefore be broadcast to third parties (i.e., spectators). The spectators are not players in the sense of MMOs or other interactive games, and therefore are unable to interact with the three-dimensional environment, but the spectators are rendering locally the world as it would be experienced by players within the MMO.

Figure 4:
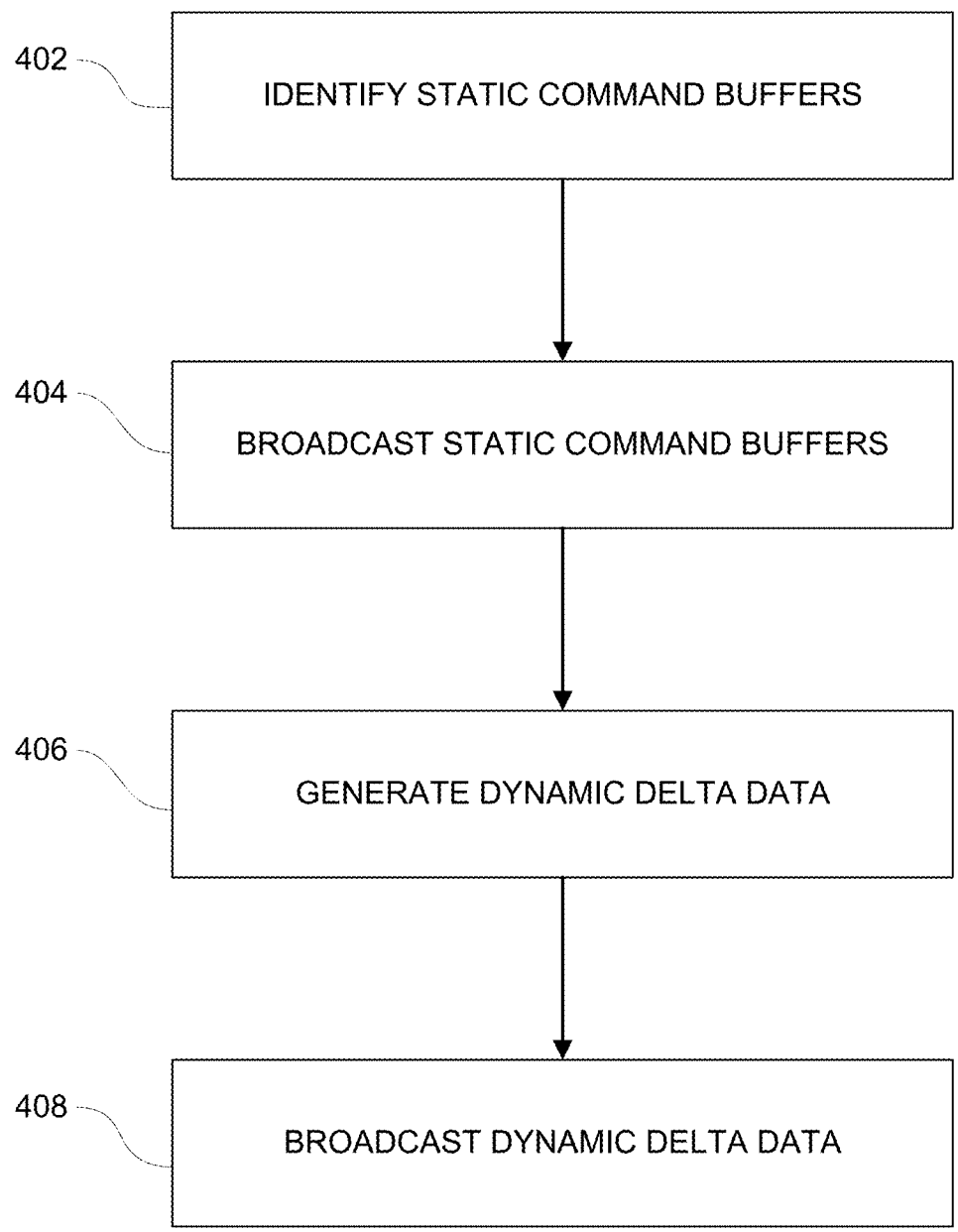
FIG. 4 illustrates an example method of rendering locally at a spectator's system the game environment of a player at a host system in accordance with the present disclosure.

FIG. 4 illustrates an example method of locally rendering a gameplay environment on a spectator system in accordance with various embodiments of the technology disclosed herein. At operation 402, static command buffers are generated by the host system used by a player to play a video game. As discussed above, static command buffers are programmed command buffers associated with a set of graphical commands. In some embodiments, the host system can generate one or more static command buffers, representing different objects or backgrounds, during an initialization stage. These static command buffers can be saved and referenced repeatedly as needed.

At operation 404, the host system converts the static command buffers into a geometry streaming format, creating static reference buffers. In various embodiments, this conversion is done by a host streaming subsystem, similar to the host streaming subsystem discussed above with respect to FIG. 2. The static reference buffers contain platform-independent representations of the static command buffers created by the host system.

At operation 406, the host system broadcasts the static reference buffers over a network. In some embodiments, the host system may broadcast the static reference buffers to one or more spectator systems, as discussed above with respect to FIG. 2. In other embodiments, the host system may broadcast the static reference buffers to one or more central servers. The central servers may be configured to store the static reference buffers, while in other embodiments the central servers may be configured to transmit the received static reference buffers to the one or more spectator systems.

At 408, one or more spectator systems initiates a live stream of a player's gameplay on the host system. During initialization, a spectator system can retrieve the one or more static command buffers from the host system or central servers, and store the static command buffers locally for future access. In other embodiments, the spectator system may generate a set of reference pointers to the static reference buffers as stored at either the host system or the central servers.

At operation 410, the host system continually adds to and executes from the native command buffer a plurality of commands to render the game environment. At operation 412, the host system collects this continuous stream of commands being added to the native command buffer to generate a dynamic command buffer. In some embodiments, the dynamic command buffer is generated by a host streaming subsystem, which collects the commands written to the native command buffer by the CPU of the host system. This collection may be accomplished by traversing the native command buffer and converting the commands into a platform-independent format, generating a geometry stream buffer. The geometry stream buffer represents the live broadcast of geometric graphics data for the game environment, i.e., a representation of the commands being generated by the host system.

At operation 414, the one or more spectator systems receive the geometry stream buffer. The geometry stream buffer represents the live state of the gameplay environment, including delta matrices showing the change in state of various characteristics of the graphical representation (i.e., the three-dimensional world). At operation 416, the spectator system traverses the geometry stream buffer and converts the commands into compatible commands for the spectator system. At operation 418, the converted commands are added to the native command buffer of the spectator system. At operation 420, the spectator system renders the three-dimensional representation of the gameplay environment from the host system. Because the rendering is performed locally, and the information broadcast includes information of the entire environment, the spectator is capable of changing the view or perspective and view parts of the environment not within the perspective of the player. The spectator feels like he or she is actually participating in the game, even though the spectator is not capable of interacting with the world beyond changing the field of view (i.e., the spectator cannot change the state of any object within the environment, only observe the environment from different angles).

Figure 5:
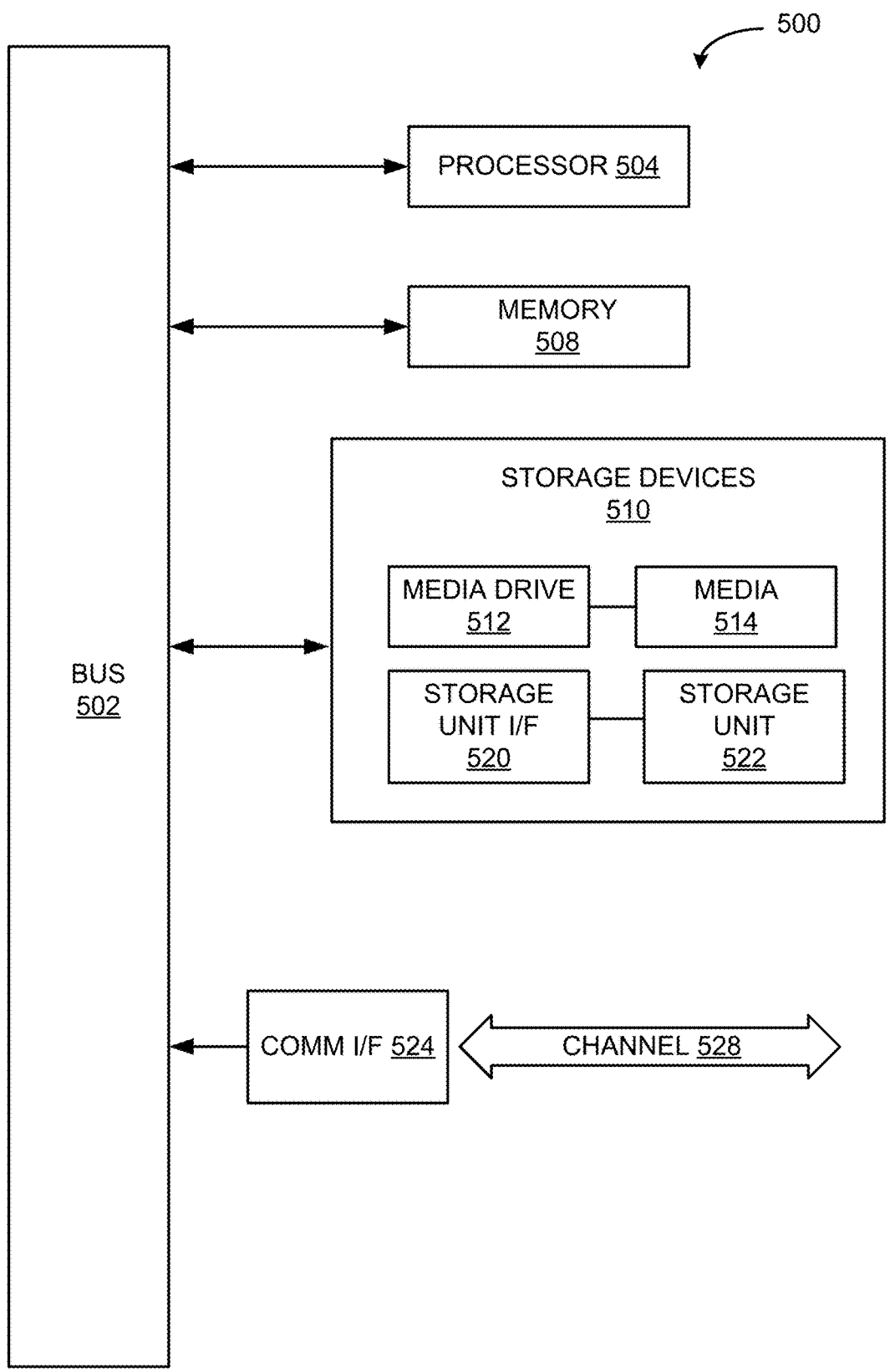
FIG. 5 illustrates an example computing component that may be used to implement various features of the systems and methods disclosed herein.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flor charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a host system comprising a host streaming subsystem; and
one or more spectator systems, each spectator system comprising a spectator streaming subsystem;
wherein the host streaming subsystem is configured to:
broadcast one or more geometry stream buffers associated with a video game environment of the host system to the one or more spectator systems, wherein the video game environment is a three-dimensional environment, wherein the one or more geometry stream buffers comprises static reference buffers, dynamic delta data, graphical geometry data, or a combination thereof; and
generate one or more static command buffers and broadcast the one or more static command buffers to the one or more spectator systems, wherein the one or more static command buffers represent a plurality of commands associated with one or more objects within the video game environment and are generated at an initialization stage of the host system; and
wherein each spectator streaming subsystem is configured to execute the one or more geometry stream buffers broadcast by the host streaming subsystem to render the video game environment of the host system locally at the spectator system.

2. The system of claim 1, wherein the host system further comprises:
   a host console;
   a host controller configured to record a player input and enable a player to interact with the video game environment associated with the host system; and
   a host display configured to display the video game environment to the player.

3. The system of claim 2, where the host display, the host controller, and the host console of the host system are integrated into a single device.

4. The system of claim 1, wherein the host system further comprises a host console, and wherein the host streaming subsystem is communicatively coupled to the host console.

5. The system of claim 1, wherein the host system further comprises a host console, and wherein the host streaming subsystem is integrated within the host console.

6. The system of claim 1, further comprising one or more central servers communicatively coupled to the host system and the one or more spectator systems, the one or more central servers configured to receive and maintain the one or more geometry stream buffers broadcast by the host system.

7. The system of claim 1, wherein the host streaming subsystem is configured to generate one or more dynamic delta command buffers and broadcast the one or more dynamic delta command buffers to the one or more spectator systems, wherein the one or more dynamic delta command buffers represent changes in one or more attributes of one or more objects within the video game environment.

8. The system of claim 7, wherein the spectator streaming subsystems are further configured to render the video game environment of the host system locally at the spectator systems by:
   collecting the one or more static command buffers and one or more dynamic delta command buffers as each is broadcast by the host system; and
   interpreting a plurality of commands for execution by the spectator console of the spectator system.

9. The system of claim 1, wherein each spectator system further comprises:
   a spectator console;
   a spectator controller configured to enable a spectator to change a viewing angle within the video game environment; and
   a spectator display configured to display the video game environment to the spectator.

10. The system of claim 9, wherein the spectator controller is limited to control of the viewing angle within the video game environment.

11. A method, comprising:
   generating, by a host graphical system, one or more command buffers representing instructions for rendering a three-dimensional environment;
   converting the one or more command buffers into a geometry stream format to generate one or more geometry stream buffers on one or more spectator systems; and
   broadcasting the one or more geometry stream buffers via a network to which the one or more spectator systems are connected;
   wherein the geometry stream format is independent of an operating system of the host graphical system and is formatted for execution by the one or more spectator systems.

12. The method of claim 11, wherein generating the one or more command buffers comprises generating instructions associated with a plurality of graphical geometries representing one or more objects in the three-dimensional environment.

13. The method of claim 12, wherein generating the one or more command buffers further comprises generating one or more static command buffers, wherein each static command buffer comprises a plurality of instructions representing the one or more objects in the three-dimensional environment.

14. The method of claim 11, wherein generating the one or more command buffers comprises collecting one or more graphical commands placed within a native command buffer of the host graphical system.

15. A method, comprising:
   collecting, by a spectator graphical system, a plurality of command buffers representing instructions for rendering a three-dimensional environment broadcast over a network;
   converting the instructions within the plurality of command buffers to a format suitable for execution by the spectator graphical system;
   writing the converted instructions into a native command buffer of the spectator graphical system; and
   rendering the three-dimensional environment at the spectator graphical system.

16. The method of claim 15, further comprising changing a first viewing angle within the rendered three-dimensional environment independent of a second viewing angle within the three-dimensional environment of a native viewing angle of the broadcasted plurality of command buffers.

17. The method of claim 16, wherein changing the first viewing angle comprises receiving an input from a spectator controller.

18. The method of claim 15, wherein rendering the three-dimensional environment at the spectator graphical system comprises:
   traversing by a graphics processing unit (GPU) of the spectator graphical system the native command buffer of the spectator graphical system; and
   executing the converted instructions as the converted instructions are traversed by the GPU of the spectator graphical system.

19. A system, comprising:
   a host system; and
   one or more spectator systems;
   wherein the host system is configured to:
      broadcast one or more geometry stream buffers associated with a video game environment of the host system to the one or more spectator systems, wherein the video game environment is a three-dimensional environment, wherein the one or more geometry stream buffers comprises static reference buffers, dynamic delta data, graphical geometry data, or a combination thereof; and
      generate one or more static command buffers and broadcast the one or more static command buffers to the one or more spectator systems, wherein the one or more static command buffers represent a plurality of commands associated with one or more objects within the video game environment and are generated at an initialization stage of the host system; and
   wherein each of the one or more spectator systems is configured to execute the one or more geometry stream buffers broadcast by the host system to render the video game environment of the host system locally at the spectator system.

* * * * *